US012368512B2

(12) United States Patent
Warner et al.

(10) Patent No.: US 12,368,512 B2
(45) Date of Patent: Jul. 22, 2025

(54) SHARED GEOGRAPHICALLY DISPERSED VIRTUALIZATION OF PON

(71) Applicant: ARRIS Enterprises LLC, Suwanee, GA (US)

(72) Inventors: Shawn W. Warner, Pepperell, MA (US); David Bowler, Stow, MA (US)

(73) Assignee: ARRIS Enterprises LLC, Suwanee, GA (US)

( * ) Notice: Subject to any disclaimer, the term of this patent is extended or adjusted under 35 U.S.C. 154(b) by 243 days.

(21) Appl. No.: 18/202,805

(22) Filed: May 26, 2023

(65) Prior Publication Data

US 2024/0063910 A1 Feb. 22, 2024

Related U.S. Application Data

(60) Provisional application No. 63/398,472, filed on Aug. 16, 2022.

(51) Int. Cl.
*H04B 10/27* (2013.01)
(52) U.S. Cl.
CPC .................................. *H04B 10/27* (2013.01)
(58) Field of Classification Search
CPC .................................................... H04B 10/27
USPC .......................................................... 398/43
See application file for complete search history.

(56) References Cited

U.S. PATENT DOCUMENTS

| | | | |
|---|---|---|---|
| 10,356,496 B2* | 7/2019 | Roe | H04Q 11/0067 |
| 2008/0037986 A1* | 2/2008 | Effenberger | H04J 14/0247 |
| | | | 398/58 |
| 2008/0138072 A1* | 6/2008 | Sakamoto | H04J 14/0282 |
| | | | 398/68 |
| 2013/0148972 A1* | 6/2013 | Kazawa | H04Q 11/0067 |
| | | | 398/100 |
| 2014/0270770 A1* | 9/2014 | Lutgen | H04J 14/0221 |
| | | | 398/66 |
| 2017/0324471 A1* | 11/2017 | Cress | H04J 14/0297 |
| 2019/0044615 A1* | 2/2019 | Saito | H04L 45/586 |
| 2020/0343975 A1* | 10/2020 | Deng | H04B 10/272 |

OTHER PUBLICATIONS

International Search Report and Written Opinion RE: Application No. PCT/US2023/023751, dated.
Das Saurav: "From CORD to SDN Enabled Broadband Access (SEBA) [Invited Tutorial]", Journal of Optical Communications and Networking, IEEE, USA, vol. 13, No. 1, Jan. 1, 2021, XP011824500, ISSN: 1943-1620m DOI. 1364/JOCN.402153 [retrieved on Dec. 4, 2020] the whole document.
DVB Organization: "Overview of PON Technologies and System Architectures.pdf", DVB, Digital Video Broadcasting, C/O EBU—17/A Ancienne Route—CH1218 Grand Saconnex, Geneva—Switzerland, Oct. 25, 2017, XP017854747, pp. 27, 28, 36, 44-46.

* cited by examiner

*Primary Examiner* — Dalzid E Singh
(74) *Attorney, Agent, or Firm* — Chernoff, Vilhauer, McClung & Stenzel, LLP

(57) ABSTRACT

A system supporting the geographically dispersed remote optical line terminals.

10 Claims, 10 Drawing Sheets

SHARED GEOGRAPHICALLY DISPERSED VIRTUALIZATION OF PON

CROSS REFERENCE TO RELATED APPLICATIONS

The present application claims the benefit of U.S. Provisional Patent Application Ser. No. 63/398,472 filed Aug. 16, 2022.

BACKGROUND

The subject matter of this application relates to geographically dispersed OLTs for passive optical networking.

A passive optical network (PON) is often employed as an access network, or a portion of a larger communication network. The communication network typically has a high-capacity core portion where data or other information associated with telephone calls, digital television, and Internet communications is carried substantial distances. The core portion may have the capability to interact with other networks to complete the transmission of telephone calls, digital television, and Internet communications. In this manner, the core portion in combination with the passive optical network enables communications to and communications from subscribers (or otherwise devices associated with a subscriber, customer, business, or otherwise).

The access network of the communication network extends from the core portion of the network to individual subscribers, such as those associated with a particular residence location (e.g., business location). The access network may be wireless access, such as a cellular network, or a fixed access, such as a passive optical network or a cable network.

Referring to FIG. 1, in a PON 10, a set of optical fibres and passive interconnecting devices are used for most or all of the communications through the extent of the access network. A set of one or more optical network terminals (ONTs) 11 are devices that are typically positioned at a subscriber's residence location (e.g., or business location). The term "ONT" includes what is also referred to as an optical network unit (ONU). There may be any number of ONTs associated with a single optical splitter 12. By way of example, 32 or 64 ONTs are often associated with the single network optical splitter 12. The optical splitter 12 is interconnected with the respective ONTs 11 by a respective optical fiber 13, or otherwise a respective fiber within an optical fiber cable. Selected ONTs may be removed and/or added to the access network associated with the optical splitter 12, as desired. There may be multiple optical splitters 12 that are arranged in a cascaded arrangement.

The optical fibers 13 interconnecting the optical splitter 12 and the ONTs 11 act as access (or "drop") fibers. The optical splitter 12 is typically located in a street cabinet or other structure where one or more optical splitters 12 are located, each of which are serving their respective set of ONTs. In some cases, an ONT may service a plurality of subscribers, such as those within a multiple dwelling unit (e.g., apartment building). In this manner, the PON may be considered a point to multipoint topology in which a single optical fiber serves multiple endpoints by using passive fiber optic splitters to divide the fiber bandwidth among the endpoints.

An optical line terminal (OLT) 14 is located at the central office where it interfaces directly or indirectly with a core network 15. An interface 16 between the OLT 14 and the core network 15 may be one or more optical fibers, or any other type of communication medium. The OLT 14 forms optical signals for transmission downstream to the ONTs 11 through a feeder optical fiber 17, and receives optical signals from the ONTs 11 through the feeder optical fiber 17. The optical splitter 12 is typically a passive device that distributes the signal received from the OLT 14 to the ONTs 11. Similarly, the optical splitter 12 receives optical signals from the ONTs 11 and provides the optical signals though the feeder optical fiber 17 to the OLT 14. In this manner, the PON includes an OLT with a plurality of ONTs, which reduces the amount of fiber necessary as compared with a point-to-point architecture.

As it may be observed, an optical signal is provided to the feeder fiber 17 that includes all of the data for the ONTs 11. Accordingly, all the data being provided to each of the ONTs is provided to all the ONTs through the optical splitter 12. Each of the ONTs selects the portions of the received optical signals that are intended for that particular ONT and passes the data along to the subscriber, while discarding the remaining data. Typically, the data to the ONTs are broadcast to the feeder fiber 17 provided to each of the ONTs.

Upstream transmissions from the ONTs 11 through the respective optical fibers 13 are typically transmitted in bursts according to a schedule provided to each ONT by the OLT. In this way, each of the ONTs 11 will transmit upstream optical data at different times. In some embodiments, the upstream and downstream transmissions are transmitted using different wavelengths of light so that they do not interfere with one another. In this manner, the PON may take advantage of wavelength-division multiplexing, using one wavelength for downstream traffic and another wavelength for upstream traffic on a single mode fiber.

The schedule from the OLT allocates upstream bandwidth to the ONTs. Since the optical distribution network is shared, the ONT upstream transmission would likely collide if they were transmitted at random times. The ONTs typically lie at varying distances from the OLT and/or the optical splitter, resulting in a different transmission delay from each ONT. The OLT measures the delay and sets a register in each ONT to equalize its delay with respect to the other ONTs associated with the OLT. Once the delays have been accounted for, the OLT transmits so-called grants in the form of grant maps to the individual ONTs. A grant map is a permission to use a defined interval of time for upstream transmission. The grant map is dynamically recalculated periodically, such as for each frame. The grant map allocates bandwidth to all the ONTs, such that each ONT receives timely bandwidth allocation for its service needs. Much of the data traffic, such as browsing websites, tends to have bursts and tends to be highly variable over time. By way of a dynamic bandwidth allocation (DBA) among the different ONTs, a PON can be oversubscribed for upstream traffic.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
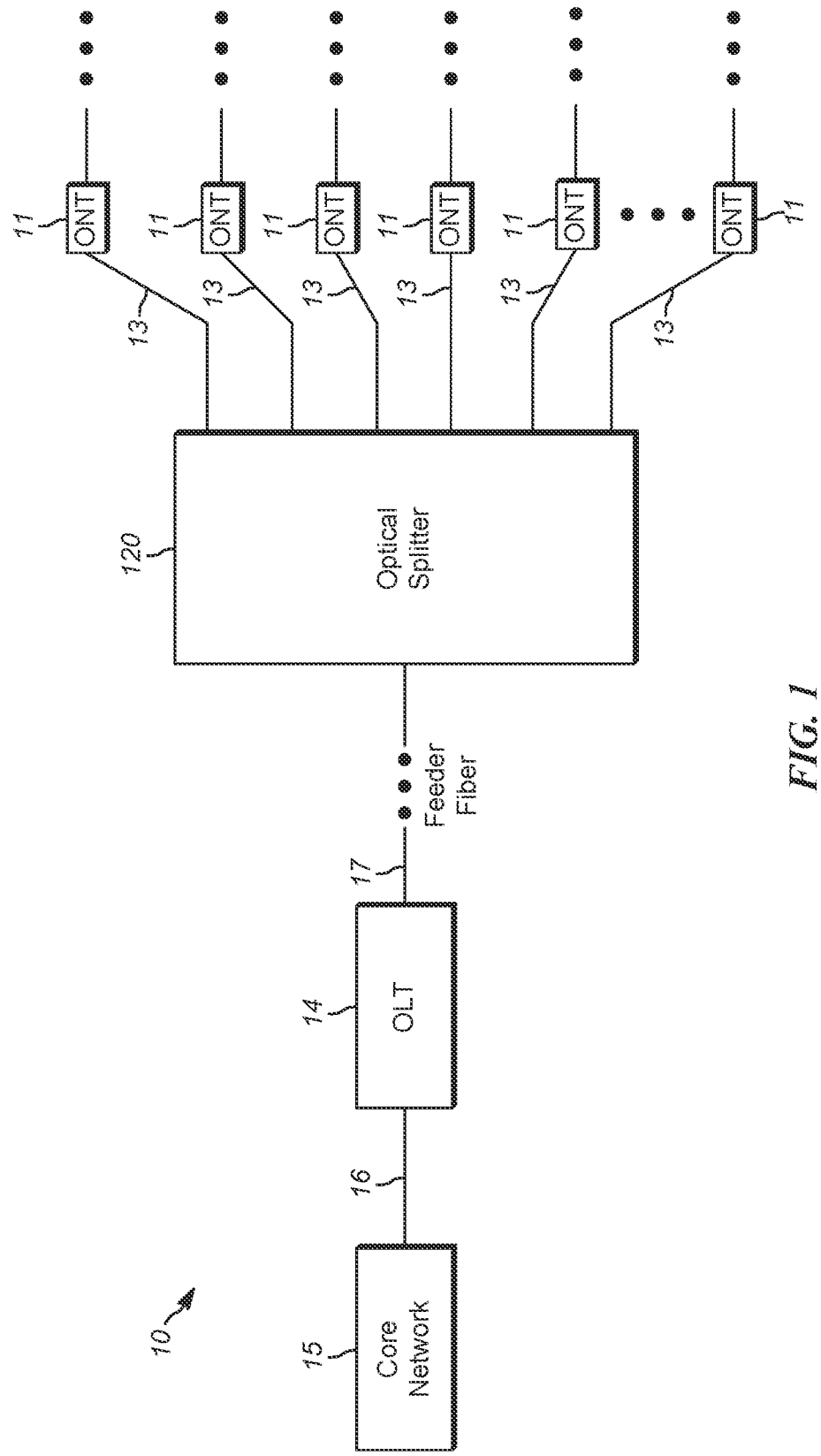
FIG. 1 illustrates a network that includes a passive optical network.
Figure 2:
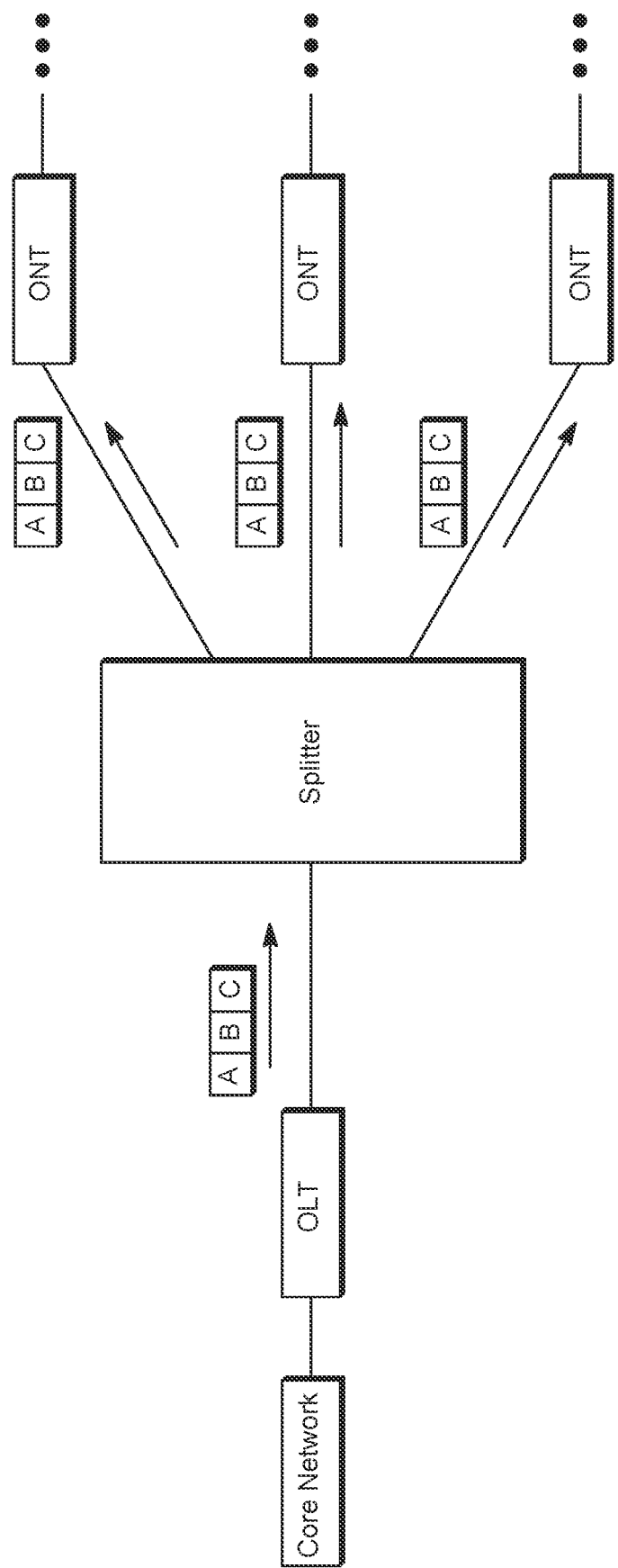
FIG. 2 illustrates a passive optical network with downstream data traffic.

Referring to FIG. 2, the PON network is based upon a point to multi-point downstream transmission arrangement. The data from the OLT is transmitted to all of the ONTs that are interconnected thereto. The data from the OLT is transmitted in the form of one or more frames, where each frame includes data for one or more of the ONTs. For example, in GPON a constant of 125 μs frame is used, where each frame includes (among other control information) an allocation map which informs on the slots granted to allocation ids. Accordingly, each frame is broken up into one or more timeslots that are designated for a corresponding selected one of the ONTs.

Figure 3:
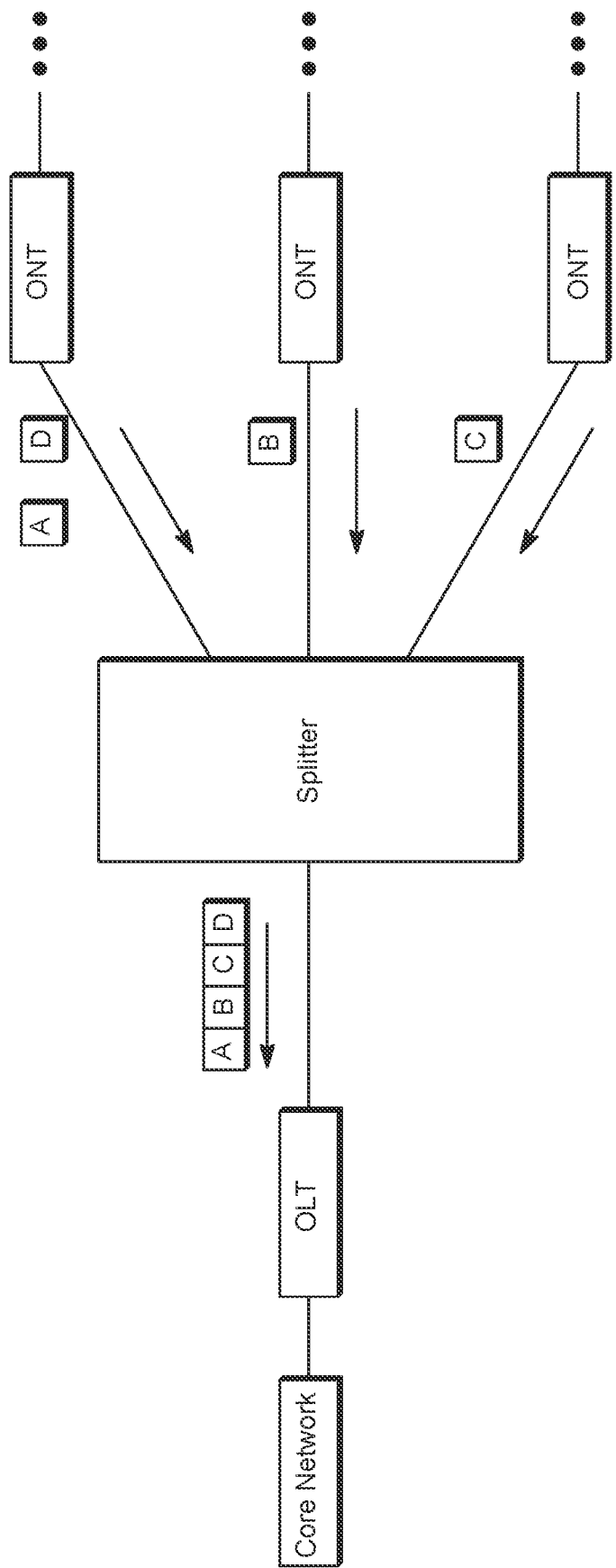
FIG. 3 illustrates a passive optical network with upstream data traffic.

Referring to FIG. 3, the PON network is based upon a multi-point to point upstream transmission arrangement using a time divisional multiple access mechanism. The OLT assigns timeslots (BWmaps) for each ONT to transmit its upstream transmission to ensure a collision free transmission. The data from each of the ONTs is transmitted to the corresponding OLT that it is interconnected thereto. The data from the ONT is transmitted in the form of a portion of one or more frames, where each frame includes data for one or more of the ONTs. For example, in GPON a reference frame of 125 μs frame is used, which is not an absolute value since a round of allocations may span through multiple upstream frames. GPON uses a Generic Encapsulation Method (GEM), which allows for the transport, segmentation and reassembly of Ethernet frames and legacy traffic (ATM or TDM). Accordingly, each frame is broken up into one or more timeslots that are designated for a corresponding selected one of the ONTs.

Figure 4:
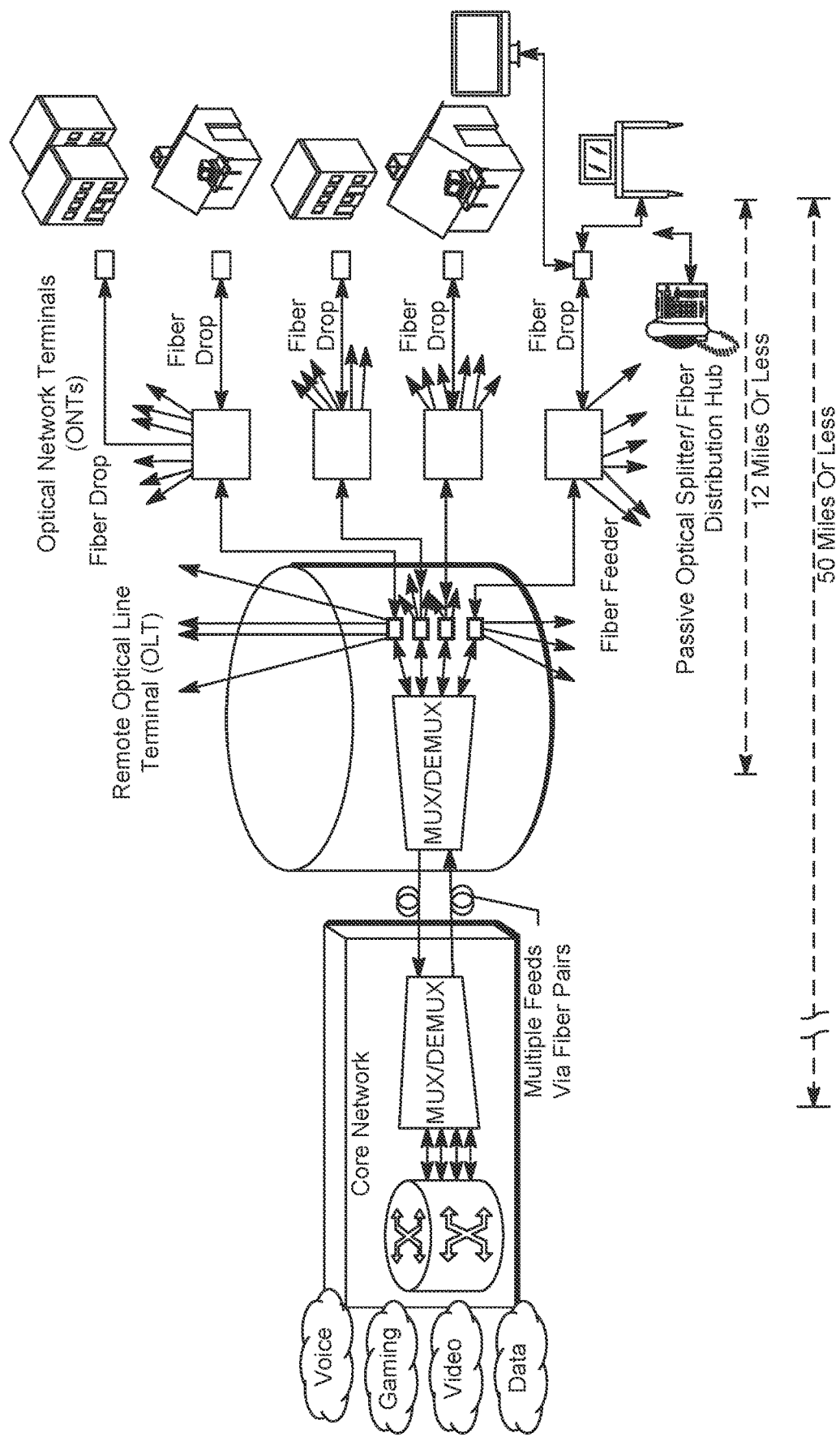
FIG. 4 illustrates a remote OLT.

Referring to FIG. 4, it is often desirable in some installations to locate the optical line terminal at a location remote from the core network, generally referred to as a remote optical line terminal (OLT). The remote OLT may include one or more feeds from the core network to the remote OLT. The remote OLT may then distribute data to a plurality of ONTs and receive data from the plurality of ONTs. Each of the ONTs in turn provides data to and receives data from customer devices. The remote OLT typically has the capability of providing services to a few hundred to a few thousand ONTs.

It is generally considered preferable to provide all the computing resources at a single location that can provide timely services to the customers, namely, at the head end. The head end therefore includes the servers for providing the high speed data services, the networking for providing the high speed data services, and the management applications for controlling and provisioning for the servers and the networking. In this manner, the head end traditionally provides for an integrated approach to ensuring timely delivery, controlling, and provisioning for effective networking.

In an environment that includes one or more remote OLTs, it was determined that a hybrid environment is suitable. The hybrid environment includes a "cloud" where infrastructure and resources are deployed for the virtualization of various aspects of the OLTs, such as at the head end. The "cloud" may be a "private cloud" or a "public cloud" provided by a cloud service provider, interconnected to the remote OLTs through a network connection, such as the Internet. The public cloud provides computing, network storage, and application resources as a service that are delivered by the public cloud provider over the network, such as the Internet. The public cloud provider typically owns, manages, provisions, and maintains the infrastructure and provides it to customers as a service, normally for a periodic subscription charge or fees based upon usage. The public cloud provider normally bears all the capital, operations, and maintenance expenses for the public cloud. The public cloud is scalable, with additional resources available upon request. In some cases, the public cloud is configured as a virtual private cloud, within the system provided by the public cloud provider.

The cloud environment, in an environment that includes one or more remote OLTs, provides the capability of the cloud servers providing, at least in part, control plane workloads such as provisioning information, statistical measurements, configuration of connections, etc., having a sufficient performance and capacity for the customers, while at the same time, providing the ability to provide management and control services that are less critical to the control plane workloads and also provide other services that are dynamic and temporary in nature using the cloud environment. The data plane workloads which are more critical should remain primarily locally to the remote OLT, while a portion thereof may be provided by the cloud server(s).

Figure 5:
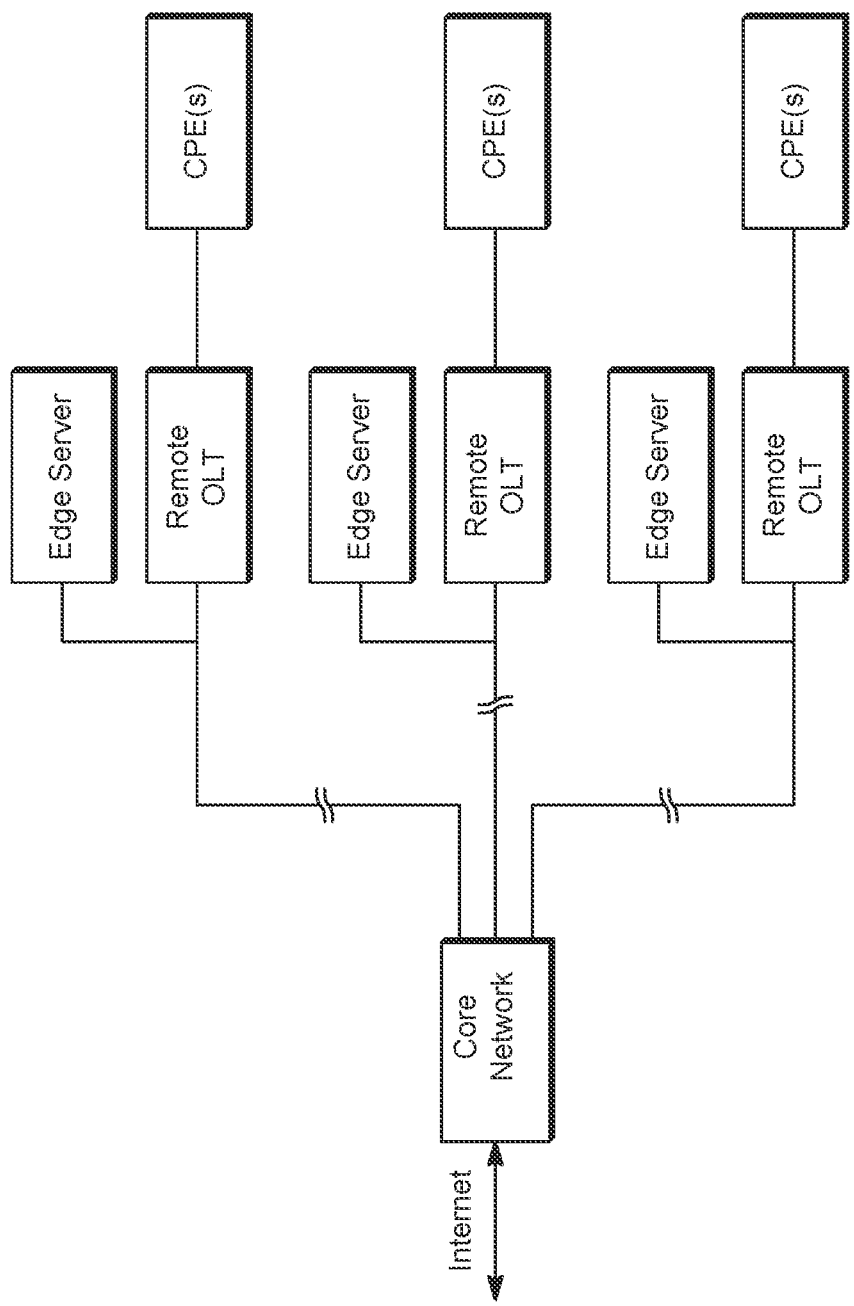
FIG. 5 illustrates remote OLTs and corresponding edge servers.

Referring to FIG. 5, for a geographically dispersed environment it was determined that the virtualized components of a remote OLT may have improved performance when the time for providing such virtualized services is provided by a geographically close edge server (e.g., general server). The remote OLT and the corresponding edge server are preferably within 5 miles of one another, and more preferably within 2 miles of one another, and more preferably within ¼ mile of one another. The pairs of remote OLT and corresponding edge server are preferably positioned more than 5 miles from one another, more preferably positioned more than 10 miles from one another, and more preferably positioned more than 20 miles from one another. The core network may be used to provision and configure the edge servers, if desired. The edge server may include processing capabilities to provide control plane services, at least in part, for the geographically proximate remote OLT and/or processing capabilities to provide data plane services, at least in part, for the geographically proximate remote OLT. The edge server and the corresponding geographically remote OLT are preferably both interconnected to one another using an Ethernet based interconnection, which is typically available on the north side interface of the remote OLT. The remote OLT is also preferably interconnected to the core network, which provides an interconnection to the Internet. In this manner, the data path for generalized Internet data traffic such as Netflix, is from each of the remote OLTs through the core network, while the virtualization of a portion of the control plane services and/or a portion of the data plane services, is provided by the corresponding edge server. Each of the respective edge servers may be interconnected to the Internet through the core network, and/or otherwise interconnected to the Internet using an alternative interconnection. Also, with the virtualization for each of the remote OLTs including microservices operating on the core network and/or one or more of the edge servers, the microservices may be transferred between the core network and/or one or more of the edge servers so that the processing burden may be redistributed.

Figure 6:
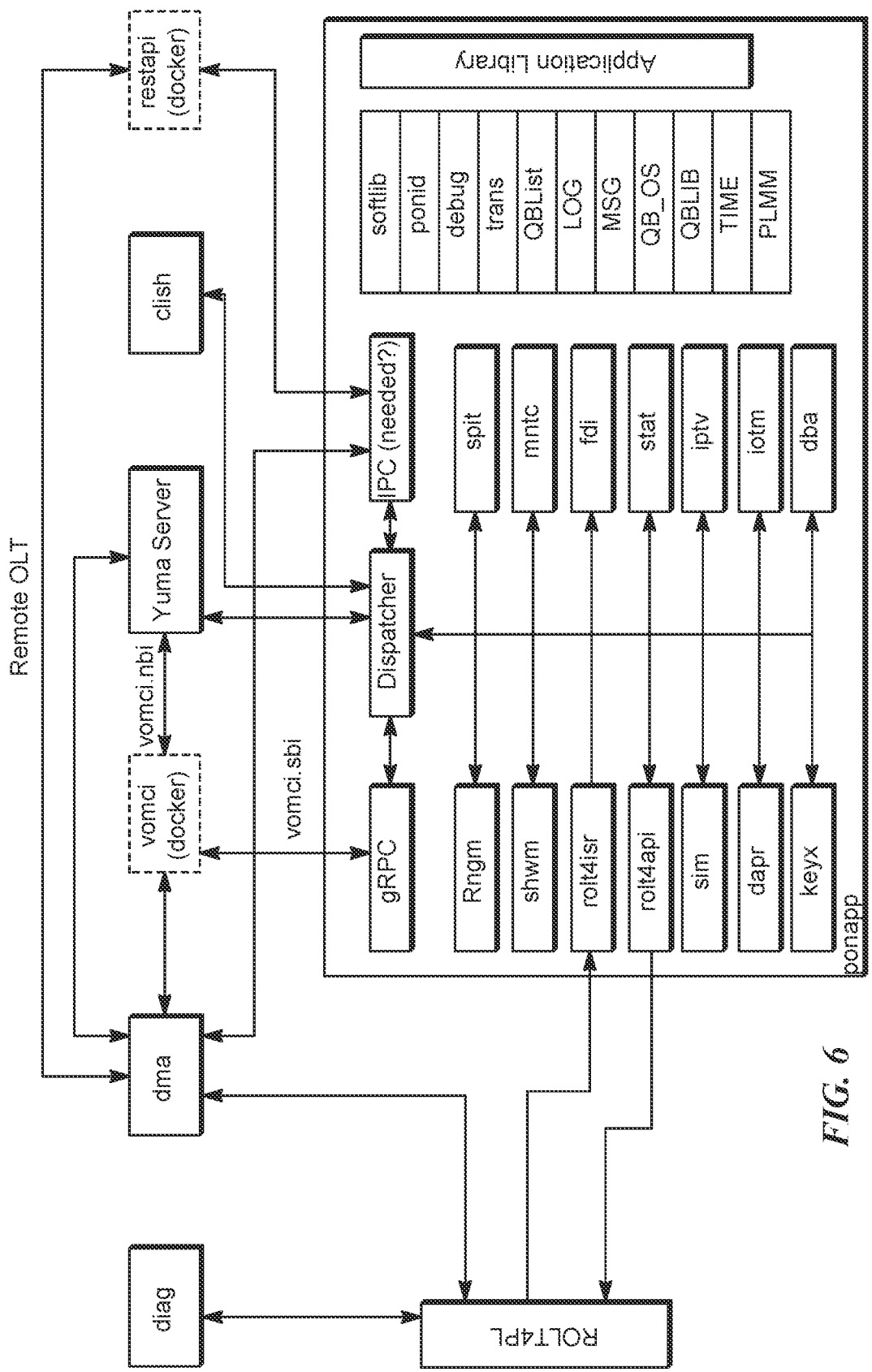
FIG. 6 illustrates an exemplary remote OLT.

Referring to FIG. 6, an exemplary remote OLT is illustrated. By way of example, a diag process, a dma process, a dish process, a restapi process, a gRPC process, a rolt4isr process, and/or a rolt4api process are preferably included locally on the remote OLT. Also, a dynamic bandwidth allocation process which allocates available bandwidth among to each of the ONTs is likewise included locally on the remote OLT. Other processes associated with the remote OLT, such as the vomci and/or Yuma server may be virtualized and located on a cloud based server. For example, the VOMCI may (1) receive service configurations from a virtual OLT management function, (2) translate the received configurations into ITU G.988 OMCI management entities and formatting them into OMCI messages, (3) encapsulating and sending formatted OMCI messages to and from a VOMCI proxy, (4) translating the OMCI messages (presenting ONT's operational data) received from the vOMCI proxy into data (e.g., notifications acknowledges, alarms, PM registers) understandable by the vOLT management function, and/or (5) sending the above ONT operational data to the vOLT management function. See, TR-451 vOMCI Specification, June 2022 and ONT management and control interface (OMCI) specification, G.988, November 2017, both of which are incorporated by reference herein in their entirety.

By way of example, the gRPC provides gRPC server and client layer to interface with multiple vomci agents which may be providing vomci services to the ROLT.

By way of example, the dispatcher provides a messaging pathway between components within the ponapp. Local microservices may register callbacks for message ids which is part of the MSG layer. Any microservice can route to another based on the top 2 bytes of a message id that indicates the destination.

By way of example, the IPC provides TCP and UDP sockets for relaying messages to and from the application in the MSG lib format, and works side by side with the dispatcher.

By way of example, the mgm is a ranging manager that provides the state machine and local for the physical layer management of the ONT. This includes an auto discovery process, the ranging of an ONT, drift management, and LOS handling.

By way of example, the shwm is a shelf manager task that handles any devices that are outside of the rolt4api/rolt4isr domain.

By way of example, the rolt4isr is a handler for incoming interrupts from the PL.

By way of example, the rolt4api handles requests from various microservices in the ponapp to program or interact with the ROLT.

By way of example, the sim provides simulations services to provide the ability to simulate devices that may not be physically present.

By way of example, the spit is a smartcard proxy interface task that provides server for application requests coming in or out of the ponapp. A typical path would be from an outside client via IPC via dispatcher into the spit. The SPIT may then relay to other microservices to perform the requested task. Some provisioning may go via the softlib DB and will be further relayed as a provisioning callout.

By way of example, the mntc is a maintenance state machine which is preferably an event drive state machine for ONTs.

By way of example, the fdi is a fault detection and isolation task as a hierarchical alarm tree service to track alarm conditions for different equipment types.

By way of example, the stat is a statistics manager that handles polling of on board statistics and aggregation of statistics for other calling functions.

By way of example, the iptv provides IPTV services, including IGMP snooping/proxy support.

By way of example, the dapr is a destination address programmer that handles unknown upstream source mac addresses for N:1 connections. This may maintain the mac forwarding table in the PL as well as pruning out aged mac addresses.

By way of example, the iotm is an IOT (aka ONT) manager that suppors directives for the ONT.

By way of example, the dba is a dynamic bandwidth allocation.

By way of example, the keyx is a key exchange task that handles key exchanging for ONTs.

By way of example, the softlib is a soft DB library implemented as a memory based database used to contain configurations of the ROLT.

By way of example, the ponid is a library used to associate ITUT serial numbers with ONT ids and/or channel assignment.

By way of example, the debug is a debug library.

By way of example, the trans is a transaction library used for transactional and state based requests for microservices.

By way of example, the QBList is a library of various list and vector functions.

By way of example, the LOG is an event log.

By way of example, the MSG is a message library.

By way of example, the QB_OS is an operating system library.

By way of example, the QBLIB is a library for local APIs.

By way of example, the TIME is a timer library used for time based callback logic.

By way of example, the PLMM is a ploam message library used for the encoding and decoding of ploam messages on the pon.

Figure 7:
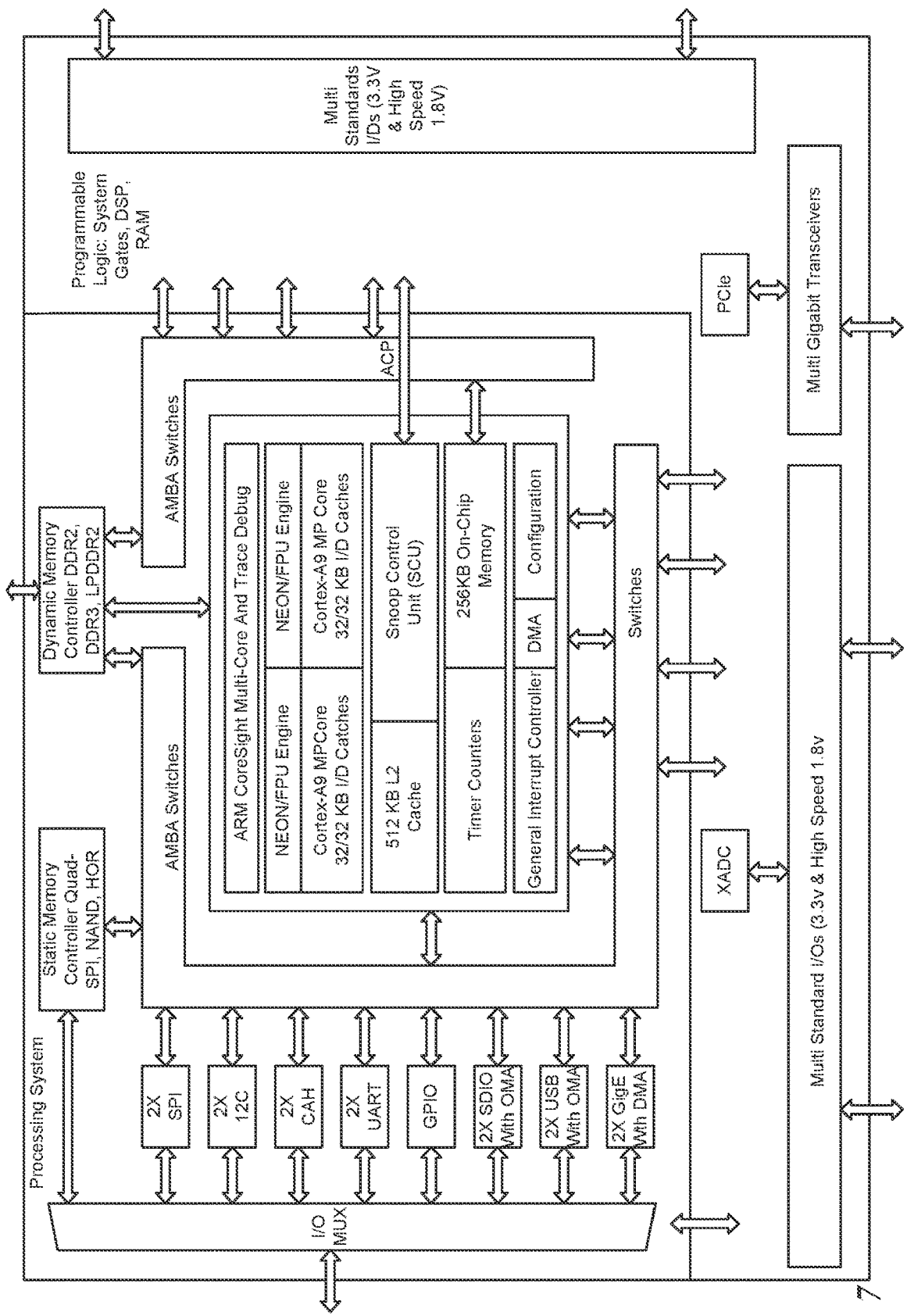
FIG. 7 illustrates a processing system.

Referring to FIG. 7, field programmable gate arrays (FPGAs) include blocks of gates that can be configured to implement the logic. In comparison, a microprocessor is a central processing unit (CPU) that executes a program that contains a specific set of instructions. Microprocessors have a fixed set of instructions which are used for an appropriate program generally referred to as programming code. Each of these instructions has its own corresponding block or blocks hardwired into the microprocessor. The FPGA in comparison does not have such hardwired logic blocks. The FPGA is often laid out like a net with each junction containing a switch that can be made or break. This set of interconnections determines how the logic of each block is determined. Programming the FPGA typically involves a hardware description language, generally referred to as programming logic. In some cases, the FPGA and the microprocessor are combined within a single package that provides added flexibility. The microprocessor typically does most of the generalized processing while passing off more specific tasks to the FPGA gate array. For the remote OLT, the combination of the microprocessor and the FPGA gate array within a single package (i.e., chip) based processing system provides programming flexibility together with particularized logic processing that is especially suitable for supporting reduced power usage limitations.

Most of the processing side of the processing system is preferably virtualized to a computing device (e.g., edge server and/or core network) external to the remote OLT. Preferably, the virtualized processing side of the processing system is primarily related to the control pane. Most of the programming logic of the processing system is preferably data plane processing for the remote OLT, while a portion thereof may be virtualized to a computing device (e.g., edge server and/or core network). Preferably, the programming logic of the processing system is primarily related to the data plane. In particular, it is desirable to include the dynamic bandwidth allocation process to be included within the processing system, and not virtualized.

As previously described, it is desirable to include the virtualized portions of the control pane of the processing system to be geographically located sufficiently close using the corresponding edge server.

As previously described, it is desirable to include the virtualized portions of the data pane of the processing system to be geographically located sufficiently close using the corresponding edge server.

The core network and/or the optical line terminals provides management and control functionality over the ONT by using an optical network unit management and control interface (OMCI). The core network 200 and the OLT 210 with which it provides data to and receives data from, transmits data and receives data using a PON protocol over an optical distribution network (e.g., optical splitters, etc.) 220. The OLT 210 passes data through the optical distribution network (ODN) 220 to the ONTs 230, and receives data through the optical distribution network (ODN) 220 from the ONTs 230. The OMCI messages between the ONT 210 and the ONUs 230 for management and control are likewise provided between the OLT 210 and the ONTs 230 through the ODN 22. The ONTs 230 provides access network line termination, a user network interface line termination for subscriber devices, and service multiplexing and de-multiplexing for subscriber devices.

The configuration management provides functions to identify the ONTs capabilities and to exercise control over the ONTs. The areas of management for the ONTs include configuration of, (1) equipment, (2) passive optical network and reach extender protection, (3) the user network interfaces, (4) Gigabit-capable passive optical network Encapsulation Method port network contention termination points; (5) interworking termination points; (6) operations, administration, and maintenance flows, (7) physical ports, (8) Gigabit-capable passive optical network Encapsulation Method adaptation layer profiles, (9) service profiles, (10) traffic descriptors, and (11) asynchronous transfer mode adaptation layer profiles. As modelled by the OMCI, the ONT detects and reports equipment, software, and interface failures and declares the corresponding alarms. The ONTs may be considered as managed entities by the exchange of information between the OLT and the ONT, based upon the OMCI messages for optical access networks.

Each of the functions related to the ONTs capabilities and management are described, to a greater or lesser extent, by various standards in a terse manner that are, typically arrived at by consensus of a diverse set of entities, each of which tends to have a different viewpoint on the meanings of the description in the standards. Accordingly, each of the ONTs and especially those developed by different manufacturers, may have variations based upon the particular manufacturer's interpretation of the various standards. This tends to be especially true for the control and management functions.

The G.988 standard describes managed entities of a protocol-independent management information base (MIB) that models the exchange of information between OLT and ONT in a PON-based access network that are subject to a standard, such as for example, G.988. See, G.988: ONU management and control interface (OMCI) specification, (11/17); G.988 (2017) Amendment 1 (11/18); G.988 ((2017) Amendment 2 (08/19); G.988 (2017) Amendment 3 (03/2); and G.988 (2017) Amendment 4 (09/21), each of which is incorporated by reference herein in its entirety. G.988 also addresses the ONT management and control channel (OMCC) setup, protocol, and message formats. In addition to interpretation considerations by various manufacturers of the G.988 standard, it is also not often sufficient for complete interoperability between different OLT and ONT manufacturers. There exist various ONTs that are simply not compliant with the various standards because of manufacturer decisions on their implementation.

Figure 8:
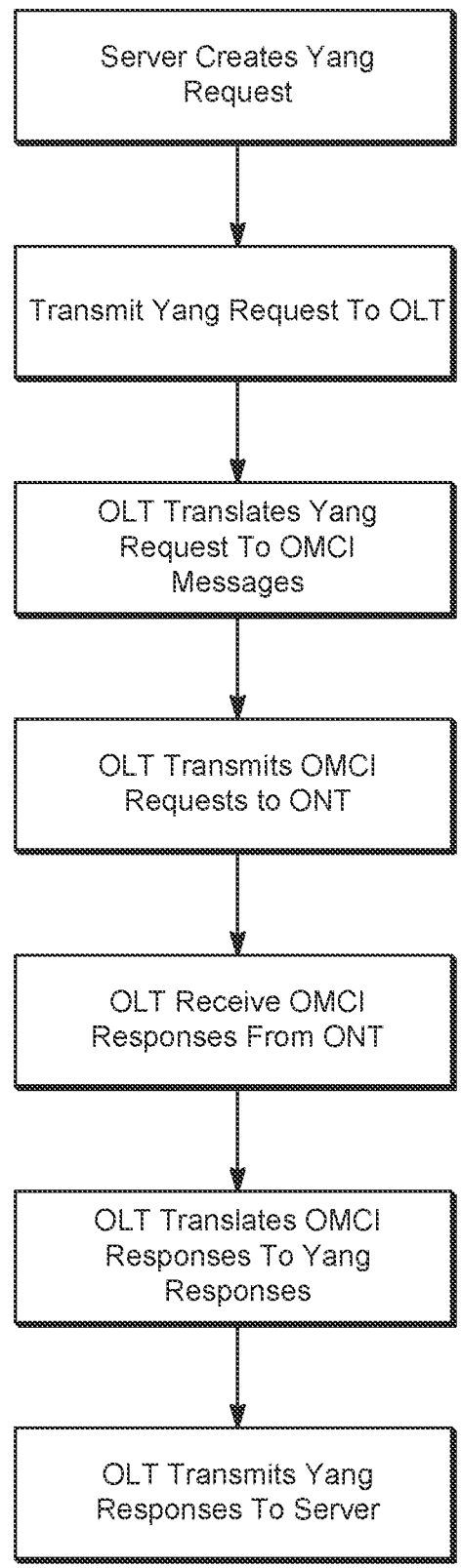
FIG. 8 illustrates processing for YANG data models using OMCI.

Referring to FIG. 8, one technique to provide an OMCI message to the ONT is for a server at the core network (i.e., any server within the network), to create a virtual OMCI set of microservices that are especially tailored to the functionality for each ONT model of each vendor. The management data maintained by the system is typically defined in terms of YANG data models that comprise modules and submodules that define configuration and state data, notifications, and remote procedure calls for. A YANG module defines a data model through its data, and the hierarchical organization of and constraints on that data. Each module is uniquely identified by a namespace URI. A module defines a single data model. However, a module can reference definitions in other modules and submodules by using the import statement to import external modules or the include statement to include one or more submodules. Additionally, a module can augment another data model by using the augment statement to define the placement of the new nodes in the data model hierarchy and a when statement to define the conditions under which the new nodes are valid. A module uses a feature statement to specify parts of a module that are conditional and the deviation statement to specify where the device's implementation might deviate from the original definition. In this manner, a module can have a large complex set of conditions that accommodate various environments. The core network provides the YANG requests to the OLT which then translates the YANG requests and responses and notifications to and from a vOLTMF (vOLT Management Function) into the OMCI messages, and the OLT transmits and receives the OMCI message requests and responses and notifications to and from the ONT.

Figure 9:
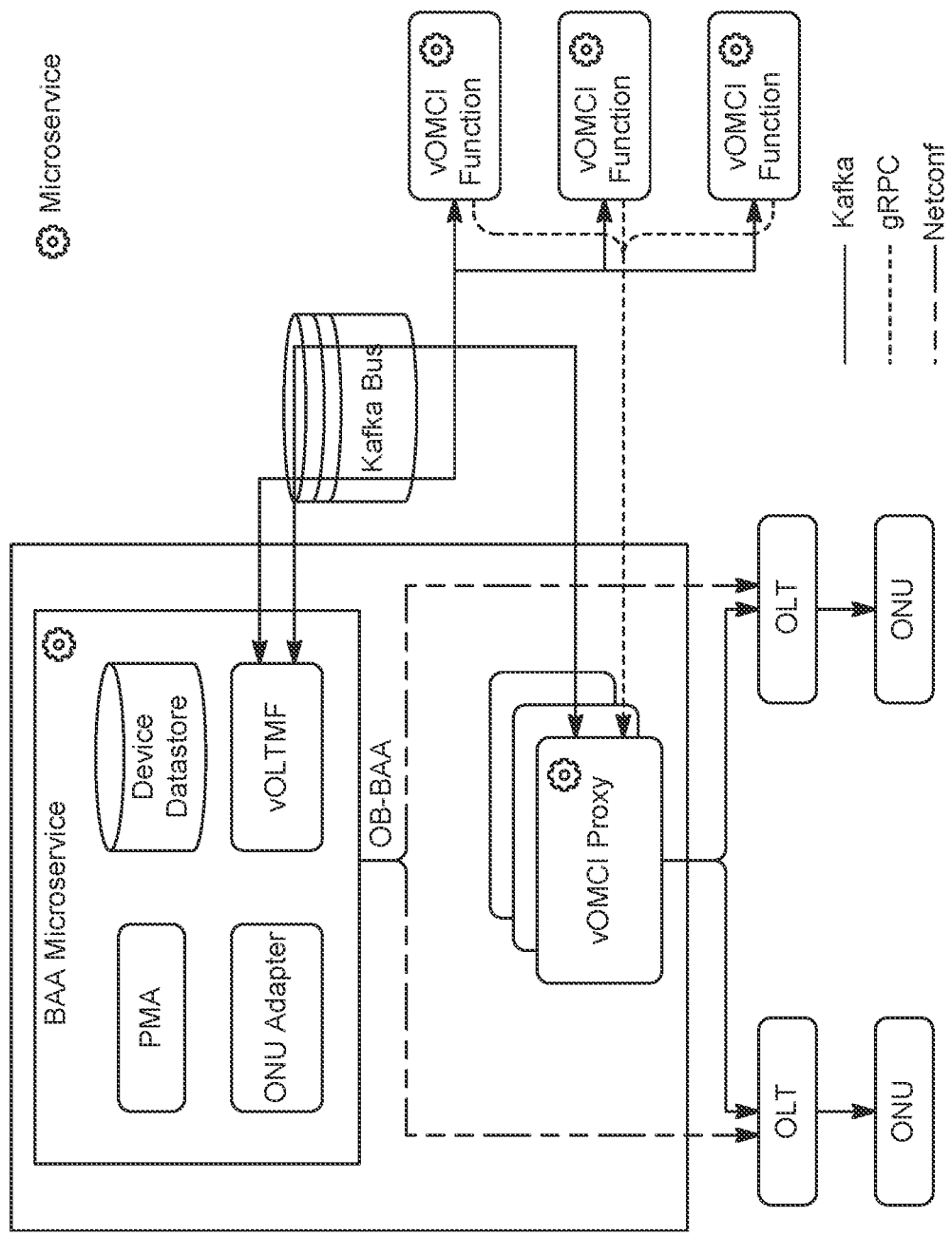
FIG. 9 illustrates processing for PON networks.

Referring to FIG. 9, a high-level design of a vOLT Management Function (vOLTMF) that may be used to manage ONTs through vOMCI messages is illustrated. There is communication between the vOLTMF, vOMCI Proxy, and vOMCI function based upon creating and deleting ONTs, receiving ont-state-change notifications, and sending requests to ONTs. The vOLTMF manages ONTs through a ONT adapter that may be deployed as broadband access abstraction, the association of which is based on the model, type, vendor, and version mentioned while creating the ONT. The ONT adapter may use a library of the YANG modules for ONTs that the vOLTMF refers to for handling ONT requests, responses, and notifications from external management systems.

The vOLTMF performs actions upon receiving notifications and requests either from an OLT device or other components within the broadband access abstraction core. For example, the onu-state-change notification that is sent by the OLT device on its Northbound Interface (NBI) that is received by broadband access abstraction core. The broadband access abstraction core propagates the notification towards vOLTMF and broadband access abstraction NBI so that it can be handled by the Access SDN M&C.

Upon reception of the notification, the vOLTMF processes the notification, checks if a preconfigured ONU device exists and authenticates the ONU, the vOLTMF transforms the notification to Google Protobufs (GPB) format and propagates the set-onu-communication Action towards the vOMCI function and vOMCI-proxy via the Kafka bus.

All the YANG requests are sent towards the vOMCI function and vOMCI Proxy via the Kafka bus in GPB format. Once the vOMCI function/Proxy processes the requests, the vOMCI function sends the notification/request response in GPB format back to the vOLTMF via the Kafka bus and the response is received through the KafkaNotificationCallback #onNotification( ).

Upon receiving the response, the vOLTMF is responsible for processing the response and performs actions accordingly.

There could be multiple interactions between the vOLTMF and the vOMCI function including parallel configuration requests/commands for either the same or different ONUs. These interactions are parallel and asynchronous such that the requests are not idle/blocked while waiting for responses because the vOLTMF has separate task queues and threadpools to handle the request/response interactions. The following shows the list of vOLTMF threadpools that spawned as new Runnable tasks, namely, processNotificationRequestPool, kafkaCommunicationPool, kafkaPollingPool, processNotificationResponsePool, and processRequestResponsePool. processNotificationRequestPool is used for processing the mediated device event listener callbacks and device notification requests. kafkaCommunicationPool is used to process individual GET/COPY-CONFIG/EDIT-CONFIG requests inside a MediatedDeviceNetconfSession spawned by preocessRequestResponsePool. kafkaPollingPool is used to tart up the KafkaConsumer implementation and polling for responses from vOMCI-function/vOMCI Proxy. processRequestResponsePool is used for processing notification responses from the vOMCI-function/vOMCI Proxy. The processRequestResponsePool is used for processing GET/COPY-CONFIG/EDIT-CONFIG requests and responses from the vOMCI-function/vOMCI Proxy. In general, the process may be considered a type of protocol adapter to one that operates on an ONT that also works with an OLT in a PON environment. As it may be observed, the manner in which the processing is performed is relatively complex, including Google Protobufs, remote procedure calls, and other complications that require a substantial amount of computational resources to process all the microservices which are burdensome for the OLT.

Figure 10:
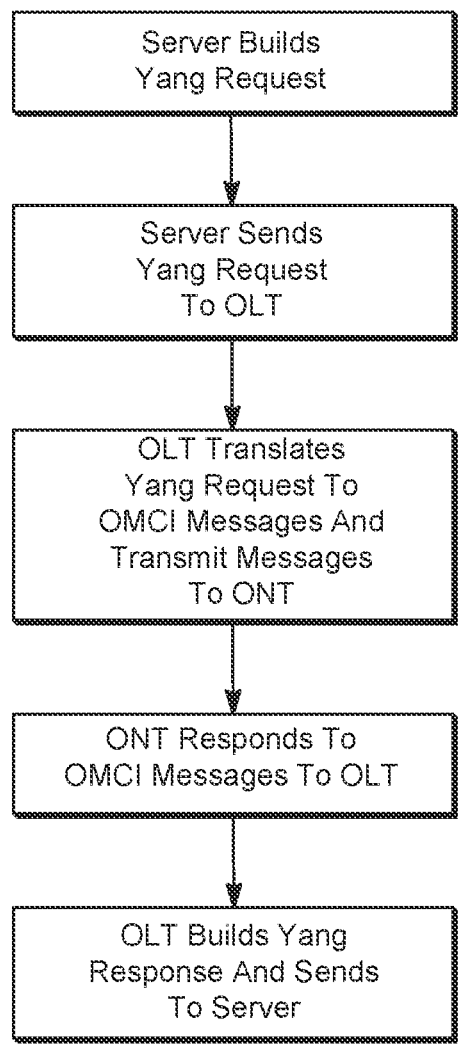
FIG. 10 illustrates YANG requests and responses.

Referring to FIG. 10, in general, the server builds or otherwise selects a YANG request for the ONT. The server then provides the YANG request to the OLT which translates the YANG request to OMCI messages and transmits such OMCI messages to the ONT. The OLT receives OMCI messages from the ONT, and translates them to YANG responses which are provided to the server.

To maintain compliance with applicable standards, there are a limited set of Yang data models that are permitted to be used, which the remote OLT is designed to be capable of processing and providing a response thereto, as appropriate. It is desirable that Yang data models that are not compliant with the applicable standards are not supported by the remote OLT, while Yang data models that are complaint with the applicable standards are supported by the remote OLT, which enables a Yang data models standard compliant server to effectively communicate with a Yang data models standards complaint remote OLT. The YANG data models are provided using an extensible data model (XML).

Rather than provide extensions to the Yang data models by the remote OLT and the corresponding server, it is desirable to include a REST API. Including of the REST API adds additional computational complexity to the remote OLT, while also providing an alternative interface to provide other data models that are not complaint with the standards complaint YANG data models. The REST API (also known as RESTful API) is an application programming interface (API or web API) that conforms to the constraints of REST architectural style and also allows for interaction with RESTful web services, as appropriate. REST is a set of architectural constraints, not a protocol or a standard. Preferably, the REST API is used for communications that are efficiently implemented, or otherwise implementable, using the standards complaint Yang data models.

When a server request is made via a RESTful API to the remote OLT, it transfers a representation of the state of the resource to the remote OLT. This information, or representation, is delivered in one of several formats, such as for example, JSON (JavaScript Object Notation), HTML, XLT, Python, PHP, or plain text, while JSON is preferred. It is noted that the YANG data models are provided using XML, while the REST API based data models are preferably provided using JSON, they use different format, therefore necessitating further increased complexity of the remote OLT.

The headers and parameters of a RESTful API HTTP request contain identifier information as to the request's metadata, authorization, uniform resource identifier (URI), caching, cookies, and/or more. There are request headers and response headers, each with their own HTTP connection information and status codes. Often, the REST API is based upon a stateless server—remote OLT communication, meaning no remote OLT information is stored between get requests and each request is separate and unconnected. The form of the data transfer includes the requested resources are identifiable and separate from the representations sent, resources may be manipulated by the remote OLT via the representation it receive because the representation contains enough information to do so, and/or self-descriptive messages returned to the server have enough information to describe how the server should process it.

The YANG server communicates with a dispatcher, that routes messages to various microservices/threads which are exposed over IPC or TCP channels, for example. In a similar manner, the REST API likewise routes messages to the dispatcher, that routes messages to various microservices/threads which are exposed over IPC or TCP channels, for example. The messages from the dispatcher, whether received from the YANG server or the REST API are preferably the same, so in this manner the YANG server and the REST API provide an interface layer for a manner of communication. Preferably, the dispatcher receives and provides a "C language" encoded message structures.

In some cases, the implementation of a particular standards compliant YANG data model may be cumbersome and inefficient, requiring four or more YANG data model based requests to fill in the multiple tables within the remote OLT so that the desired data can be determined and obtained from the remote OLT. In such cases with the limitations of the standards complaint YANG data model, the REST API may include a more specific data model that requires fewer, and preferably only a single, request in order to determine and obtain the desired data from the remote OLT. Also, there is some desirable information that is contained within a remote OLT and/or ONT that a standards complaint YANG data model does not include a corresponding object for, such as part of the device statistics. By way of example, the REST API may be used to obtain information for the multiple states (3 or more) states of the ONT, which is more than merely operational yes, and operational no. More detailed information related to the state of the ONT is especially useful for debugging. For example, the REST API may be used to obtain data, or groups thereof, for any of the information described in ONT management and control interface (OMCI) specification, G.988, November 2017.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An access network for a passive optical network comprising:
   (a) a first optical line terminal includes a north bound interface that receives and sends data from and to a first server, respectively;
   (b) said first optical line terminal includes a first port that receives and sends optical data from and to a first set of optical network terminals, respectively, through a first optical fiber;
   (c) a second optical line terminal includes a north bound interface that receives and sends data from and to a second server, respectively;
   (d) said second optical line terminal includes a second port that receives and sends optical data from and to a second set of optical network terminals, respectively, through a second optical fiber;
   (e) said first server that provides first virtualized control plane services for said first optical line terminal, where said first server and said first optical line terminal are within 5 miles of one another;
   (f) said second server that provides second virtualized control plane services for said second optical line terminal, where said second server and said second optical line terminal are within 5 miles of one another;
   (g) wherein said first server is at least 5 miles away from both said second optical line terminal and said second server;
   (h) wherein said second server is at least 5 miles away from both said first optical line terminal and said first server;
   (i) wherein said first optical line terminal sends and receives data services for said first set of optical network terminals though a core network separate from either of said first and second servers, said second optical line terminal sends and receives data services for said second set of optical network terminals though said core network separate from either of said first and second servers.

2. The access network of claim 1 wherein said first server is at least 10 miles away from both said second optical line terminal and said second server, and said second server is at least 10 miles away from both said first optical line terminal and said first server.

3. The access network of claim 1 wherein said first server is at least 20 miles away from both said second optical line terminal and said second server, and said second server is at least 20 miles away from both said first optical line terminal and said first server.

4. The access network of claim 1 wherein said first server and said first optical line terminal are within 2 miles of one another, and said second server and said second optical line terminal are within 2 miles of one another.

5. The access network of claim 1 wherein said first server and said first optical line terminal are within ¼ mile of one another, and said second server and said second optical line terminal are within ¼ mile of one another.

6. The access network of claim 1 wherein said first server is at least 20 miles away from both said second optical line terminal and said second server, said second server is at least 20 miles away from both said first optical line terminal and said first server, said first server and said first optical line terminal are within ¼ mile of one another, and said second server and said second optical line terminal are within ¼ mile of one another.

7. An access network for a passive optical network comprising:
   (a) a first optical line terminal includes a north bound interface that receives and sends data from and to a first server, respectively;
   (b) said first optical line terminal includes a first port that receives and sends optical data from and to a first set of optical network terminals, respectively, through a first optical fiber;
   (c) said first server that provides first virtualized control plane services for said first optical line terminal, where said first server and said first optical line terminal are within 5 miles of one another;
   (d) wherein said first optical line terminal sends and receives data services for said first set of optical network terminals though a core network separate from said first server;
   (e) said first optical line terminal including a processing system that includes a single chip that includes (1) a field programmable gate array and (2) a microprocessor having a fixed set of instructions;
(f) wherein a portion of said first virtualized control plane services is selectively processed by either (1) said microprocessor using a portion of said fixed set of instructions and (2) said first server;
(g) wherein a dynamic bandwidth allocation for said first optical line terminal is processed by said field programmable gate array and not processed by said first server.

8. The access network of claim 7 wherein said first optical line terminal and said first server are within 5 miles of one another, while said core network is at least 5 miles away from both said first optical line terminal and said first server.

9. An access network for a passive optical network comprising:
(a) a first optical line terminal includes a north bound interface that receives and sends data from and to a core network;
(b) said first optical line terminal includes a first port that receives and sends optical data from and to a first set of optical network terminals, respectively, through a first optical fiber;
(c) said core network provides first virtualized control plane services for said first optical line terminal;
(d) said first optical line terminal including a processing system that includes a single chip that includes (1) a field programmable gate array and (2) a microprocessor having a fixed set of instructions;
(e) wherein a portion of said first virtualized control plane services is selectively processed by either (1) said microprocessor using a portion of said fixed set of instructions and (2) said first server;
(f) wherein a dynamic bandwidth allocation for said first optical line terminal is processed by said field programmable gate array and not processed by said first server.

10. An optical line terminal for a passive optical network comprising:
(a) said optical line terminal includes a north bound interface that receives and sends data from and to a core network;
(b) said first optical line terminal includes a first port that receives and sends optical data from and to a first set of optical network terminals, respectively, through a first optical fiber;
(c) said optical line terminal transmitting data to at least one optical network terminal using optical network unit management and control interface messages based upon said optical line terminal receiving at least one YANG data model that is translated by said optical line terminal to said optical network unit management and control interface messages;
(c) said optical line terminal transmitting data to at least one optical network terminal using optical network unit management and control interface messages based upon said optical line terminal receiving at least one REST API data model that is translated by said optical line terminal to said optical network unit management and control interface messages.

\* \* \* \* \*